March 1, 1960

R. H. DIETRICH 2,926,879

TUMBLER HOLDER

Filed May 27, 1957

INVENTOR.
RAYMOND H. DIETRICH
BY
*Cullen & Cantor*
ATTORNEYS

March 1, 1960 R. H. DIETRICH 2,926,879
TUMBLER HOLDER

Filed May 27, 1957 3 Sheets-Sheet 3

INVENTOR.
RAYMOND H. DIETRICH
BY *Cullen & Cantor*
ATTORNEYS

United States Patent Office 2,926,879
Patented Mar. 1, 1960

2,926,879
TUMBLER HOLDER

Raymond H. Dietrich, Kalamazoo, Mich.

Application May 27, 1957, Serial No. 661,711

1 Claim. (Cl. 248—311)

This invention relates to a tumbler holder and more particularly to a holder which is universally pivotable whereby regardless of the position of the object to which the holder is attached, the tumbler in the holder will always remain in an upright position.

An object of this invention is to form a tumbler holder which may be mounted upon supports such as a moving vehicle, boat, airplane, portable trays, or the like, and wherein regardless of the position or movement of the support upon which the tumbler holder is mounted, the tumbler will always remain in an upright position.

Another object of this invention is to form a tumbler holder for mounting upon a movable support wherein the position of the support changes periodically, and wherein the holder is pivotable universally relative to the support so that the tumbler remains upright and the contents thereof will not spill regardless of the position of the support.

Still a further object of this invention is to form a simple, easily assembled and disassembled holder for tumblers which may be mounted upon a stud connected to any support object such as a vehicle, boat, tray, etc., and wherein the holder may be removed from the support and may be easily disassembled for storage and cleaning, and reassembled for use when desired.

These and other objects of this invention will become apparent upon reading the following description of which the attached drawings form a part.

With reference to the drawings, in which.

Figure 1:
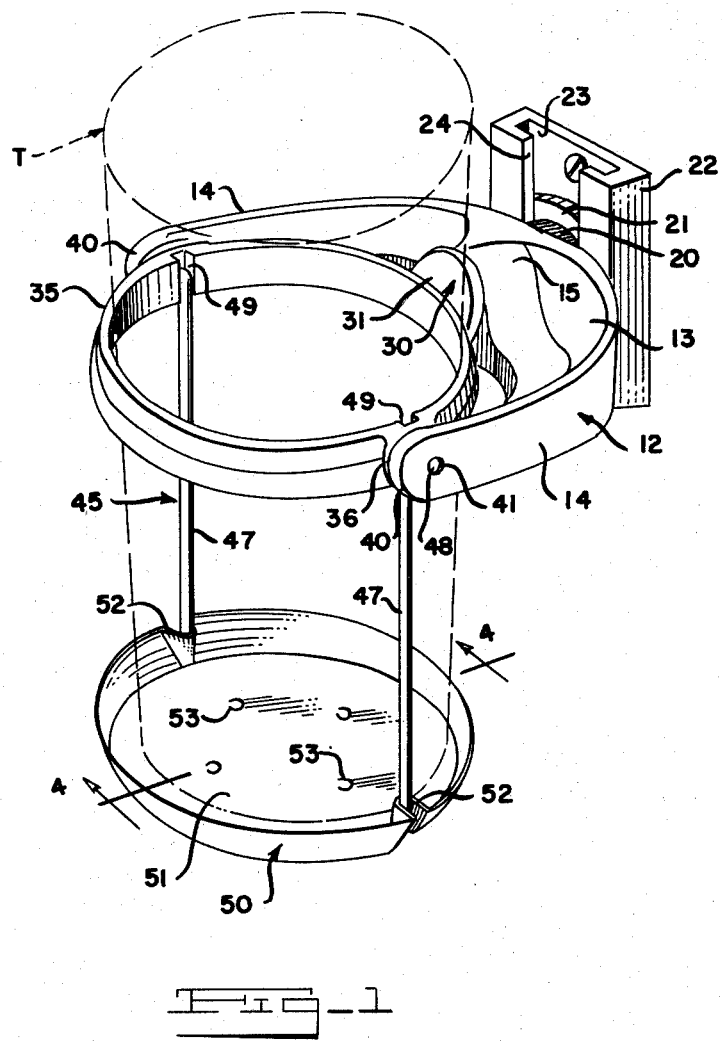
Fig. 1 is a perspective view of the tumbler holder mounted within a bracket secured to some object (not shown).
Figure 2:
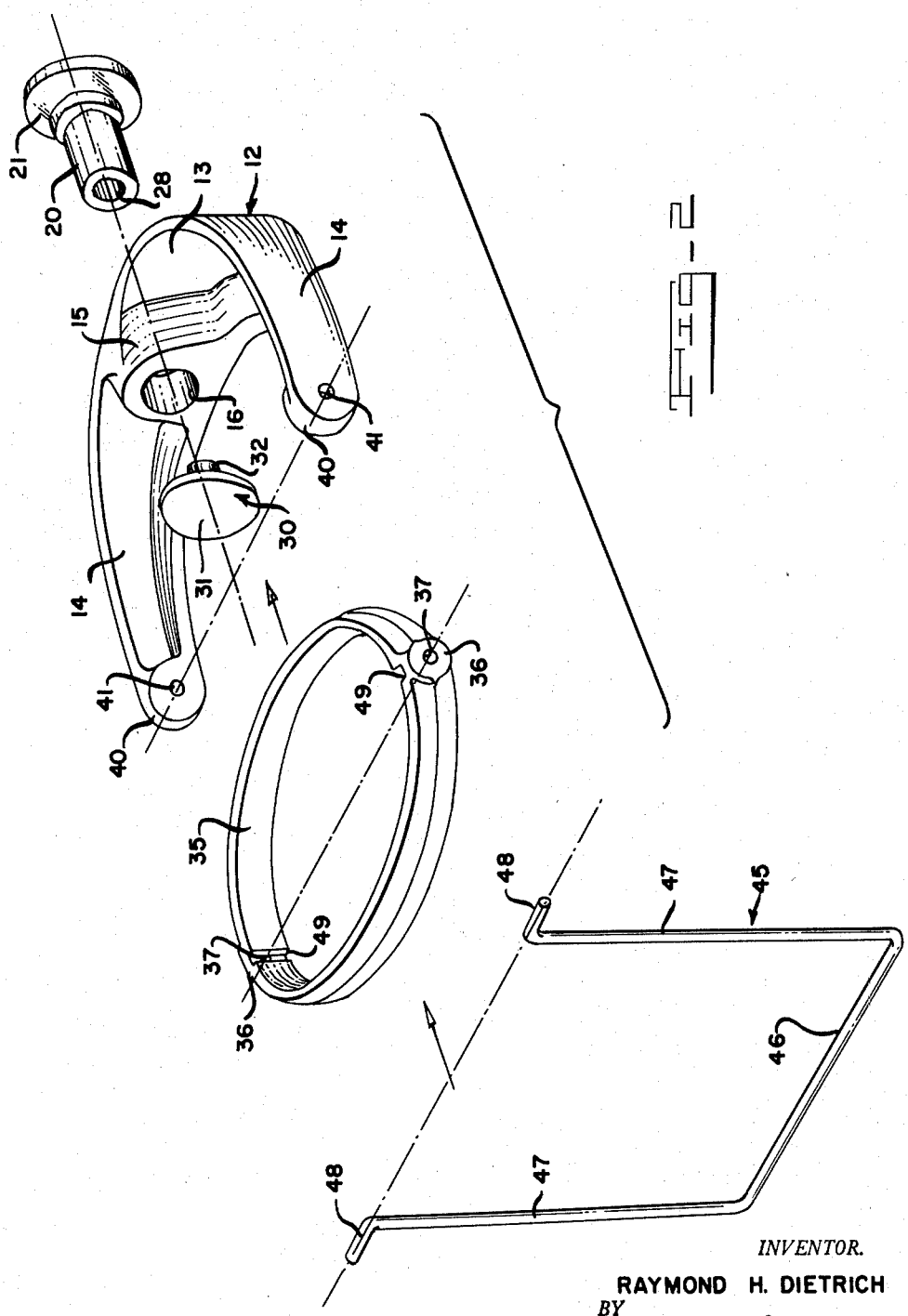
Fig. 2 is a perspective exploded view of the tumbler holder.
Figure 4:
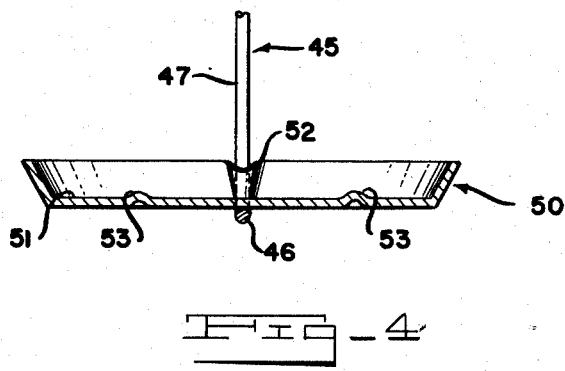
Fig. 4 is a cross-sectional view of the coaster pan taken in the direction of arrows 4—4 of Fig. 1.

The tumbler support of this invention, with reference to Figs. 1 and 4, is formed of a U-shaped yoke 12 having a base portion 13 and leg portions 14. A boss 15 is formed on the base portion 13 and the boss is journaled at 16 with the journal being concentric with the axis of the U.

Figure 3:
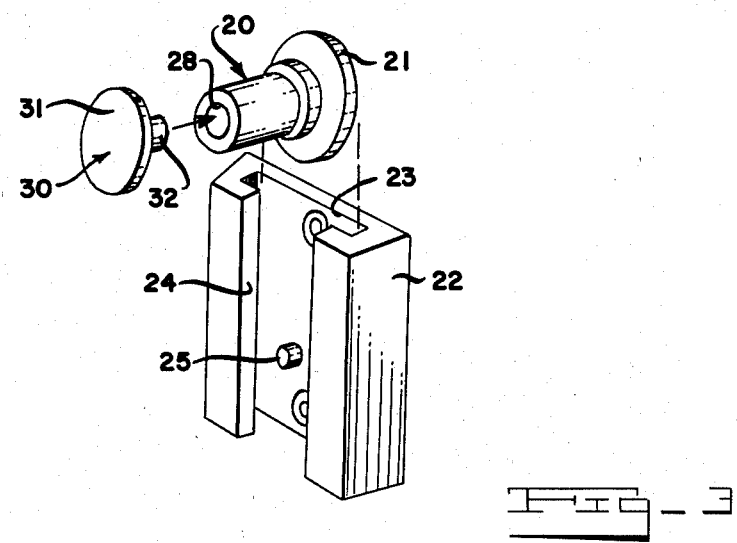
Fig. 3 is a perspective exploded view of the stud, plug for locking the stud to the tumbler holder, and mounting bracket.

The yoke is arranged to be supported upon a stud 20 which stud may be connected rigidly to any support object such as an automobile, boat, airplane, tray, etc. In the illustration shown in Figs. 1 and 3, the stud is provided with an enlarged head 21 so that it may be removably connected to a support bracket 22 having a channel 23, with the mouth of the channel 24 being constricted relative to the base of the channel. Thus, the head 21 of the stud 20 is inserted downwardly into the channel 23 and is restrained from moving forward relative to the bracket by the constricted mouth 24. Likewise, the head is restricted from moving downwardly out of the channel by a pin or other stop protuberance 25.

In this particular illustration, the bracket may be screwed or otherwise mechanically fastened to a support body and the stud may remain with the yoke at all times. However, this is not essential, but rather at times it may be desirable to fasten the stud immovably to the support object and remove the yoke from the stud.

In order to hold the stud within the journal 16 so that the yoke may pivot about its axis upon the stud, a plug 30 is provided. This plug 30 is provided with an enlarged head which overlaps the boss 15 around the edge of the journal 16 and has an extension 32 which fits into the journal 16 and also into a socket 28 formed in the end of the stud. The socket and extension may be threaded whereby the plug may be threadedly engaged with the stud. Likewise, a force fit may be used which produces a frictional engagement so that a manually applied force will force the plug extension into the socket 28 and in reverse will remove the extension from the socket.

To support and hold a tumbler T, a ring 35 is provided. The ring 35 is provided with opposed outwardly facing bosses 36 with openings 37 formed through the bosses and with the openings being arranged upon an axis of the circle formed by the ring. Likewise, bosses 40 may be formed on the legs 14 of the yoke 12 which bosses are centrally apertured at 41.

To assemble the ring to the yoke, the apertures 41 are aligned with the openings 37 in the ring 35 and axle pins are inserted through the aligned openings so that the ring may pivot relative to the yoke. The line of pivoting of the ring is arranged normal to the axis of the yoke so that the ring pivots on an axis normal to the yoke axis.

To support the tumbler T which is dropped downwardly into the ring 35, and also to form the pivoting axles, a U-shaped springy wire support 45 is provided. This support wire has a base 46 which is spaced beneath the ring 35 and legs 47 which extend upwardly from the base. The ends of the legs are bent at 48 to form pivot pins or axles which are inserted through the openings 37 from the inside of the ring to the outside of the ring and then extend through the openings 41 in the yoke 12.

It can be seen, that since the U-shaped wire is of springy metal, simply squeezing the legs together will remove the axle or pivot pin sections 48 from the aligned openings for removal of the ring from the yoke and the reverse is true for assembly.

It is preferred that the wire support remains rigid with the ring and pivots therewith. Therefore, channels 49 are provided inside of the ring and are arranged longitudinally of the ring so that the upper portions of the leg 47 fit within these channels whereby the ring and the wire support 45, when assembled, form one immovable unit relative to each other.

A tumbler T, may be inserted through the ring 35 and rested upon the support base 37 whereby, the tumbler and the ring will remain in an upright position, with the ring being horizontal regardless of the position of the bracket 20. It can be seen, that should the bracket move in any particular direction because of the motion of the article to which it is attached, the yoke 12 will pivot on stud 20, as will the ring relative to the yoke so that the tumbler is stabilized in an upright position. Thus, the contents of the tumbler will always remain intact and will not be spilled by any motion of the article to which the bracket 20 is attached.

Where the tumbler support is used in a place where dripping from any condensation formed on the tumbler is undesirable, a coaster pan 50 may be used to catch the condensation. This pan is arranged to fit between the legs 47 of the wire support whereby the base 51 of the pan rests upon the base 46 of the wire support. In order to insure a tight fit between the coaster pan and the support wire 45, indentations 52 are provided on the opposite sides of the pan walls. Thus, the pan may be slid between the legs 47 and the friction between the indentations 52 and the legs 47 will prevent the coaster pan from moving relative to the plane of the legs and the walls of the indentation will prevent the coaster pan from falling off the legs. Likewise, the support base 46 supports the bottom of the coaster pan.

In addition, upwardly facing bumps 53 are provided on the pan bottom so that the base of the tumbler rests upon the bumps rather than upon the pan whereby condensation will collect in the pan but will not collect upon the bottom of the tumbler.

This invention may be further developed within the scope of the following attached claims.

Accordingly, it is desired that the foregoing description be read as being merely illustrative of an operative embodiment of this invention and not in a limiting sense.

I now claim:

In a tumbler holder, a horizontally disposed ring having diametrically opposed holes; a horizontally disposed U-shaped yoke also having diametrically opposed holes alined with those of the ring, with said yoke being outside said ring; and a U-shaped springy wire having the upper ends of its legs bent away from each other and disposed in the alined opposed openings of said ring and yoke.

References Cited in the file of this patent
UNITED STATES PATENTS

| | | |
|---|---|---|
| 662,676 | Maynz | Nov. 27, 1900 |
| 1,787,734 | Rowling | Jan. 6, 1931 |
| 2,075,080 | Baker | Mar. 30, 1937 |
| 2,520,412 | Jensen | Aug. 29, 1950 |
| 2,698,155 | Bowman | Dec. 28, 1954 |
| 2,710,101 | Rubin | June 7, 1955 |
| 2,754,078 | Koger | July 10, 1956 |
| 2,776,756 | Allan | Jan. 8, 1957 |
| 2,788,558 | Bowers | Apr. 16, 1957 |

FOREIGN PATENTS

| | | |
|---|---|---|
| 1,121,763 | France | May 7, 1956 |